United States Patent
Huxford et al.

(10) Patent No.: US 11,303,237 B2
(45) Date of Patent: Apr. 12, 2022

(54) METHOD OF DETERMINING AN ANGULAR OFFSET OF A POSITION SENSOR

(71) Applicant: ZF AUTOMOTIVE UK LIMITED, Solihull (GB)

(72) Inventors: Robert James Huxford, Birmingham (GB); David Julian Moule, Birmingham (GB)

(73) Assignee: ZF Automotive UK Limited

(*) Notice: Subject to any disclaimer, the term of this patent is extended or adjusted under 35 U.S.C. 154(b) by 0 days.

(21) Appl. No.: 17/048,497

(22) PCT Filed: Apr. 16, 2019

(86) PCT No.: PCT/EP2019/059862
§ 371 (c)(1),
(2) Date: Oct. 16, 2020

(87) PCT Pub. No.: WO2019/201961
PCT Pub. Date: Oct. 24, 2019

(65) Prior Publication Data
US 2021/0135614 A1    May 6, 2021

(30) Foreign Application Priority Data
Apr. 16, 2018   (GB) .................................. 1806202

(51) Int. Cl.
*H02P 21/18*   (2016.01)
(52) U.S. Cl.
CPC .................................. *H02P 21/18* (2016.02)
(58) Field of Classification Search
CPC ........ H02P 21/18; H02P 6/182; G01D 5/2046
See application file for complete search history.

(56) References Cited

U.S. PATENT DOCUMENTS

| | | | |
|---|---|---|---|
| 2011/0148331 A1* | 6/2011 | Parison, Jr | B60N 2/0232 318/244 |
| 2012/0217912 A1* | 8/2012 | Wu | H02P 6/20 318/400.04 |
| 2014/0167663 A1 | 6/2014 | Ide et al. | |
| 2015/0100264 A1* | 4/2015 | Qian | H02P 21/18 324/202 |
| 2015/0303845 A1 | 10/2015 | Suda et al. | |
| 2016/0043676 A1 | 2/2016 | Adam et al. | |
| 2017/0019043 A1* | 1/2017 | Zhao | H02P 6/182 |

FOREIGN PATENT DOCUMENTS

| | | |
|---|---|---|
| CN | 108233790 A | 6/2018 |
| DE | 102012204147 A1 | 10/2012 |

* cited by examiner

*Primary Examiner* — Cortez M Cook
(74) *Attorney, Agent, or Firm* — Robert James Harwood (57) ABSTRACT

A method of determining an offset between an angular position indicated by a rotary position sensor assembly secured directly or indirectly to the rotor of a multi-phase permanent magnet AC motor and an actual electrical position of the motor rotor, includes the steps of: applying a voltage vector to the motor, which is aligned with a known angular position of the motor; waiting for the motor rotor to move to a location in which the vector when considered in the dq frame of reference is centered on the d-axis; measuring the angular position of the rotor indicated by the position sensor, and determining the offset from the difference between the measured angular position and the known actual position of the vector.

12 Claims, 12 Drawing Sheets

METHOD OF DETERMINING AN ANGULAR OFFSET OF A POSITION SENSOR

CROSS-REFERENCE TO RELATED APPLICATION

This application is a national stage of International Application No. PCT/EP2019/059862, filed Apr. 16, 2019, the disclosure of which is incorporated herein by reference in its entirety, and which claimed priority to UK Patent Application No. 1806202.6, filed Apr. 16, 2018, the disclosure of which is incorporated herein by reference in its entirety.

TECHNICAL FIELD

The present disclosure relates to methods of determining an angular offset of a position sensor assembly, for example for use in the control of a rotary electromechanical actuator. It in particular relates to a method of determining an offset between a zero position indicated by a position sensor and an actual zero position of the rotary component of the actuator such that the offset may be compensated during the operation of the actuator.

BACKGROUND

It is known to provide a position sensor assembly that is able to determine the angular position of an object that is free to rotate around an axis, such as a rotor of a motor. This type of sensor is sometimes called a rotary encoder, and converts the rotary motion into one or more output signals that have values that independently or when combined indicate the angular position of the rotating object.

One application of a position sensor assembly of this kind is to measure the position of a motor rotor for use in control of the position of the motor. Motors come in many forms, but one particular form that has been considered by the applicant is a motor that is integrated into an electromechanical actuator for a hydraulic braking system. Such actuators may be used to convert rotary motion of the motor into a linear motion of a plunger that is connected to a cylinder of a hydraulic braking circuit. A high degree of accurate control of the position of the motor is needed, and in most cases space is limited so that it is difficult to locate a position sensor.

In one arrangement, disclosed in U.S. Pat. No. 4,909,577, an electromagnetic actuator comprises a motor having a stator and a rotor. The rotor is hollow and is provided on an inner surface with a helical groove that forms part of a ball screw linear drive located inside the rotor. The drive comprises an elongate screw having an external helical groove that complements that of the rotor. The two grooves are filled with metal balls and the balls act on the screw to create a linear movement of the screw relative to the stator. The linear movement of the screw is used to control the hydraulic pressure in a hydraulic braking circuit of a vehicle. The rotor is supported by bearings at both ends.

In an alternative arrangement disclosed in the applicant's earlier patent EP 0 317 182, a stepper motor has a screw that is fixed to the protruding end of the rotor of a motor so that as the rotor rotates the screw also rotates. The screw protrudes into a bore formed in an end face of a piston that is in turn inserted in the bore of a cylinder filled with hydraulic fluid. The piston is prevented from rotating in the cylinder, and as the rotor rotates, the piston is moved along the cylinder. This alters the pressure of the fluid in the hydraulic brake circuit connected to the cylinder.

In both cases, the rotation of the rotor is limited to a fixed number of revolutions before a respective end stop is reached. To precisely control the position of the actuator, and also to prevent it being driven at speed into the end stops, the angular position of the rotor that is attached to the motor must be known. This is achieved using a rotary position sensor assembly In one known arrangement, a rotary position sensor assembly comprises at least one sensor; and a sensor target that is moveable relative to said sensor in the form of a tubular body and a plurality of substantially radially extending sections that are integrally formed with the tubular body. Each radially extending section comprising two substantially radial upper edge portions, and a radially extending support set back from the upper edge portions, each of the upper edge portions providing a target for the sensor. In other arrangements, instead of a tubular body a disk shaped sensor target may be provided.

Ideally, the sensor target is fixed to the rotor so that an angular position of 0 degrees mechanical indicated by the target will correspond to the actual 0 degrees mechanical position of the rotor. This removes the need for alignment procedures and additional allowances within the control system for any discrepancy. In practice, there may be an offset between the zero position indicated by the sensor and the motor electrical zero position. Depending on the method of construction, the offset may be anywhere between 0 degrees and 360 degrees, especially if the sensor is attached with no regard to the actual angular position of the rotor.

The angular position sensor can be calibrated in a number of ways. It may be calibrated using external equipment to calibrate the sensor signals. The angular position may alternatively be fixed through the use of mechanical features that define the position sensor alignment removing the need to calibrate all together. These typically lead to tight mechanical tolerances, additional mechanical measurements, fixtures and consequent impact upon cost and cycle times.

SUMMARY

An object of the present disclosure is to provide a simple and reliable method of determining the offset between the angular position indicated by the rotary position sensor assembly and the mechanical position of the motor rotor.

According to a first aspect, the present disclosure provides a method of determining an offset between an angular position indicated by a rotary position sensor assembly secured directly or indirectly to the rotor of a multi-phase permanent magnet AC motor and an actual electrical position of the motor rotor, the motor comprising a plurality of phases, the method comprising the steps of: (1) applying a voltage vector to the motor, which is aligned with a known angular position of the motor; (2) waiting for the motor rotor to move to a location in which the vector when considered in the dq frame of reference is centered on the d-axis; (3) measuring the angular position of the rotor indicated by the position sensor; and (4) determining the offset from the difference between the measured angular position and the known actual position of the vector.

By aligning a voltage vector in the $\alpha\beta$ stator frame of reference with a known electrical angular position, the rotor will move until the magnetic flux of the rotor magnets is aligned with the magnetic flux generated by the phase currents. At this point, it can be assumed that the rotor is at the known angular position where the vector lies along the d-axis in the dq frame of reference and is no longer applying a torque to the rotor. By then measuring the actual position of the rotor, by reading the electrical position output from the angular position sensor, the electrical position offset can be determined.

The method may select a vector which is aligned with a first one of the motor phases corresponding to zero degrees electrical of the motor. For a motor with many pole pairs on the rotor, the same vector position in the fixed frame of reference of the motor stator may set the rotor in multiple mechanical motor positions, each offset by 360 degrees electrical. For the motor control, knowing the rotor position within an electrical cycle alone is usually sufficient. For applications that use the rotor position sensor for mechanical positioning of the rotor or a connected load, additional information is required to determine the mechanical rotor position. Such information can be found, for example, by identifying an end stop where the rotor is unable to move past a point.

The method may alternatively centre the vector on a known position which is not 0 degrees electrical. The centre of the vector could correspond to any electrical position which is an integer multiple of 360/N where N is the number of phases. Hence for a three phase motor with one electrical revolution per mechanical revolution the vector may be aligned with a Phase at 0, 120 degrees or 240 degrees in a three phase motor. Similarly for a three phase permanent magnet synchronous motor with five pole pairs, and therefore five electrical cycles per mechanical revolution the vector may be aligned positions 24 mechanical degrees apart.

In each case, the method may determine the offset from 0 degrees electrical by subtracting the known phase offset from the electrical position of the applied net vector. Hence if phase A is at 120 degrees electrical, and the position sensor reading is 130 degrees, the offset will be determined to be 130−120=10 degrees. If phase A is known to correspond to 0 degrees the offset in that case will be 130−0=130 degrees.

The method may comprise applying a vector that is fixed in position relative to the motor stator during the measurement time and aligned with the one phase A, so that current only flows in through one phase A and flows equally out of the other phases of the motor. For a three-phase motor there will be two other phases that may be denoted as Phase B and Phase C (or in through two phases B and C and out through the one phase A).

Using the fixed vector the estimate is a simple process as the rotor should move to, and be fixed at, the known mechanical position as the motor aligns with the d-axis.

A vector whose position relative to the stator is known can be formed from the addition of two or more vectors and cause the rotor to move to a known position where there is no net torque acting upon the rotor. To limit the current that would be drawn, the vectors may be applied for short periods repetitively using well-known pulse width modulation methods.

The applicant has appreciated that this method works well for low friction assemblies where the rotor and the position sensor fixed to it can rotate freely, but that it may yield a slight error where friction is high. This is because as the rotor approaches the d-axis position the q-axis torque applied to it reduces to zero, becoming very small at small offset angles from the d-axis position. The rotor may therefore come to rest a small angular distance away from the ideal known position at which the estimate is to be taken.

In a refinement, therefore, the method may comprise applying a varying current vector rather than a fixed vector, the varying current vector alternating between a first value in which the vector is slightly advanced of the centre position and a second position in which the vector is slightly behind the centre position so as to cause the rotor to dither back and forth across the centre line.

For a three phase motor, the method may comprise applying values of A+B and A+C vector respectively for fixed alternate time intervals to cause the rotor to dither about an angular position centred on Phase A, the method determining the angular centre position about which the rotor dithers and determines the offset between that position and the actual position. The centre position may be derived by determining the average position of the rotor from the varying output of the angular position sensor. In this case, the Phase A vector should be significantly larger than the dither +B and +C vectors. The +B and +C vectors should be applied for the same time periods. Through doing so their net effect is that the rotor will dither between positions either side of that set by the +A vector.

The +B and +C torque producing vectors need to be applied for sufficient time that any friction present is overcome and the rotor is able to move. This could be detected online and vectors adjusted to appropriate lengths. The dither may be a small angle, for instance less than 20 degrees electrical or less than 5 degree mechanical for a five pole pair motor. The angle should be large enough to allow the rotor to move to overcome any friction or stiction as it passes through the d-axis position.

The method of dithering about a centre point is advantageous as it means the correct angular position can be determined rather than the point at which the alignment torque matches the friction torque.

To avoid dead time issues, the method may be carried out so that no motor phase is switched at the same time as the other. Without this step, any dead time in the motor switching pattern could add/subtract from the vectors applied. Offsets would result, which may be acceptable in some cases but not if greater accuracy is required.

The method may further comprise the steps of: at a later time applying a vector aligned with a second, different, known angular position on the motor stator; waiting for the motor rotor to move to a location in which the vector when considered in the dq frame of reference is centered on the d-axis; measuring the angular position of the rotor indicated by the position sensor; and determining the offset from the difference between the measured angular position and the known actual centre position of the second vector.

For example, if the first vector is aligned with Phase A the second the vector may be fixed and aligned with Phase B, or may dither between B+A and B+C values. So instead of large +A vector with smaller +B/C vectors to generate the dither, the vector pattern applied will be large +B with smaller +A/C vectors, then large +C+ small A, + large C+ small B.

In a preferred arrangement, vectors may be applied that have known positions that change in a sequence that moves in a single direction around the stator over time such that the change of vector position causes the rotor to follow the vectors around the stator and step through a range of electrical positions that are increasingly offset both electrically and mechanically from the start position set by the first vector.

For each position, the vector may be aligned with a different one of the phases on the motor. So, for a three phase motor the sequence may be A, then B then C where this is the order in which the phases are spaced around the motor stator. The offset may be determined by taking an average of the offset values derived from the first and second, and any subsequent, vectors.

By estimating the offset for multiple vectors at different known positions, a more accurate overall estimate of offset can be obtained. For a three phase motor, this results in, where the vector is aligned with the different phases, the rotor position moving in steps of 120 degrees electrical from one vector to the next in the sequence, although many other sequences could be used.

By moving the vector to cycle through the phases, the method provides N estimates (for an N phase system) to check the alignment in each electrical cycle, and N×pole-pairs in a mechanical revolution. For example with a 12-slot, 10-pole motor, the method may generate 5 lots of 3 estimates in each mechanical revolution of the rotor, to give a total of 15 estimates of the offsets per mechanical revolution. By cycling through each one, the rotor will rotate by itself between positions to follow the vector.

The disclosure may therefore move the vector to the new position, wait for a predetermined time to allow the rotor to rotate and settle, then take the measurement of the position, then move the vector to the next position, and wait again, and so on.

The method may comprise repeatedly moving the vector and taking position measurements until the rotor has moved by one full mechanical revolution, and taking an average of the estimates to produce an overall estimate of the offset.

The method may comprise, for each estimate obtained from each fixed or dithered vector position, performing a check that an estimated value does not deviate from any other estimated value by an amount greater than a set threshold, and, in the event that it does, raising an error flag. Any large deviation would indicate a problem with the offset learning or with one of the motor phases or elsewhere in the system.

The applicant has appreciated that in cases where the rotor or a part fixed to it will hit an endstop position during a revolution, the rotor should during an initial step be moved a distance away from the end stop that is sufficient to allow a complete electrical revolution to be made. The method may comprise generating a vector that rotates in the fixed stator frame of reference to cause the rotor to rotate through a range greater than 1 mechanical revolution.

The method may therefore comprise, before any measurements are made, a step of generating a rotating αβ frame vector that will cause the rotor to rotate through one continuous mechanical revolution and during the rotation measuring the angular position of the rotor, whereby in the event that the angular position does not indicate that the rotor has moved through one full mechanical revolution the method determines that the motor rotor has hit an endstop, and in that event the method comprises subsequently generating a rotating dq frame vector that will cause the rotor to rotate through an angle greater than or equal to one continuous mechanical revolution in the opposite direction and permitting the rotor to move to follow the vector.

At the end of this step, the motor will be known to be at least one full revolution away from an end stop and hence can be moved correctly through a full mechanical revolution to carry out the estimate of angular position offset.

The method may be applied to a position sensor that forms a part of an electromechanical actuator for use in a hydraulic braking circuit of a vehicle comprising: an electric motor having a stator and a rotor, and a linear actuator that is located within the motor, in which the stator is located within a housing having a first end and a second end, the rotor is located inside the housing and comprises an elongate rotor body having a bore passing from one end of the body to the other, the bore being enlarged over a first portion of the body located towards the first end of the motor, and being of reduced size over a second portion of the body located towards the second end of the motor, the linear actuator comprising an elongate shaft that is located within the bore in the elongate rotor body, the shaft having a screw part at one end carrying an external thread that extends along a portion of the shaft that is located within the enlarged portion of the bore in the rotor body, and a fixing part at the other end shaft that is a tightly located into the bore of the second portion of the elongate body to prevent radial movement of the shaft relative to the elongate body, the linear actuator further comprising a drive nut that surrounds the screw part of the shaft and is located, at least in a retracted position, inside the enlarged bore of the first portion of the rotor body, the drive nut having an internal thread and being connected to the screw part through a set of balls that engage the threads of the drive nut and screw part, and further comprising a position sensor according to the first aspect of the disclosure in which the sensor target is secured to the rotor and the sensor is fixed to the stator or the housing.

The method may be applied to any arrangement in which an angular position sensor measures the position of a rotor of another rotating component fixed to the rotor as long as there is a fixed (or known) relationship between the angle of the rotor and the angle of the sensor.

To reduce the power consumed, the vectors may be pulse width modulated. Using a 50 percent duty cycle will consume around half the power compared with applying constant DC voltages to the phases.

The sensor may comprise a target that is fixed to the rotating part and a sensor that senses the position of the target. The target may comprise a disk or a tube.

The method described above is suitable for use during operation of the motor to which the angular position sensor is attached by deliberating generating and applying the vectors during use of the device to which the angular position sensor is attached. The method may apply the required vector at any time when the motor is not required to rotate using the same motor control and drive circuit used during normal operation. Hence, for a typical PWM controlled motor, the method may comprise instructing the motor control to apply suitable PWM signals to produce the required vectors and observe the position indicated by the position sensor. This ability to use the same PWM controller that drives the motor during regular use means that no additional hardware is required to measure the offset. This also means the sensor can be calibrated in its final position of use when connected to the regular motor drive and control circuitry.

Additionally, because the method can be used for motors that have limited ranges of mechanical position, it is suitable for use when the motor is installed in a larger mechanical device, such as an electromechanical linear actuator where the range of rotation is limited by the linear output of the device striking end stops.

According to a second aspect, the disclosure provides a linear actuator comprising:
a motor having a rotor;
a mechanical arrangement which converts rotation of the rotor into a linear translation of an output part, the range of movement of the rotor being limited by the allowable range of movement of the linear part;
a rotary position sensor assembly fixed to the rotor; and
a signal processing unit arranged in use to determine an offset between an angular position indicated by the rotary position sensor assembly and an actual electrical position of the motor rotor by carrying out the steps of the method of the first aspect of the disclosure.

The linear actuator may provide a range of movement of the output part corresponding to more than one full mechanical rotation of the rotor.

The linear actuator may an electromechanical actuator for use in a hydraulic braking circuit of a vehicle comprising: an electric motor having a stator and a rotor, and a linear actuator that is located within the motor, in which the stator is located within a housing having a first end and a second end, the rotor is located inside the housing and comprises an elongate rotor body having a bore passing from one end of the body to the other, the bore being enlarged over a first portion of the body located towards the first end of the motor, and being of reduced size over a second portion of the body located towards the second end of the motor, the linear actuator comprising an elongate shaft that is located within the bore in the elongate rotor body, the shaft having a screw part at one end carrying an external thread that extends along a portion of the shaft that is located within the enlarged portion of the bore in the rotor body, and a fixing part at the other end shaft that is a tightly located into the bore of the second portion of the elongate body to prevent radial movement of the shaft relative to the elongate body, the linear actuator further comprising a drive nut that surrounds the screw part of the shaft and is located, at least in a retracted position, inside the enlarged bore of the first portion of the rotor body, the drive nut having an internal thread and being connected to the screw part through a set of balls that engage the threads of the drive nut and screw part, and further comprising a position sensor according to the first aspect of the disclosure in which the sensor target is secured to the rotor and the sensor is fixed to the stator or the housing.

BRIEF DESCRIPTION OF THE DRAWINGS

There will now be described by way of example only, one embodiment of the present disclosure with reference to and as illustrated in the accompanying drawings of which.

DETAILED DESCRIPTION

Figure 1:
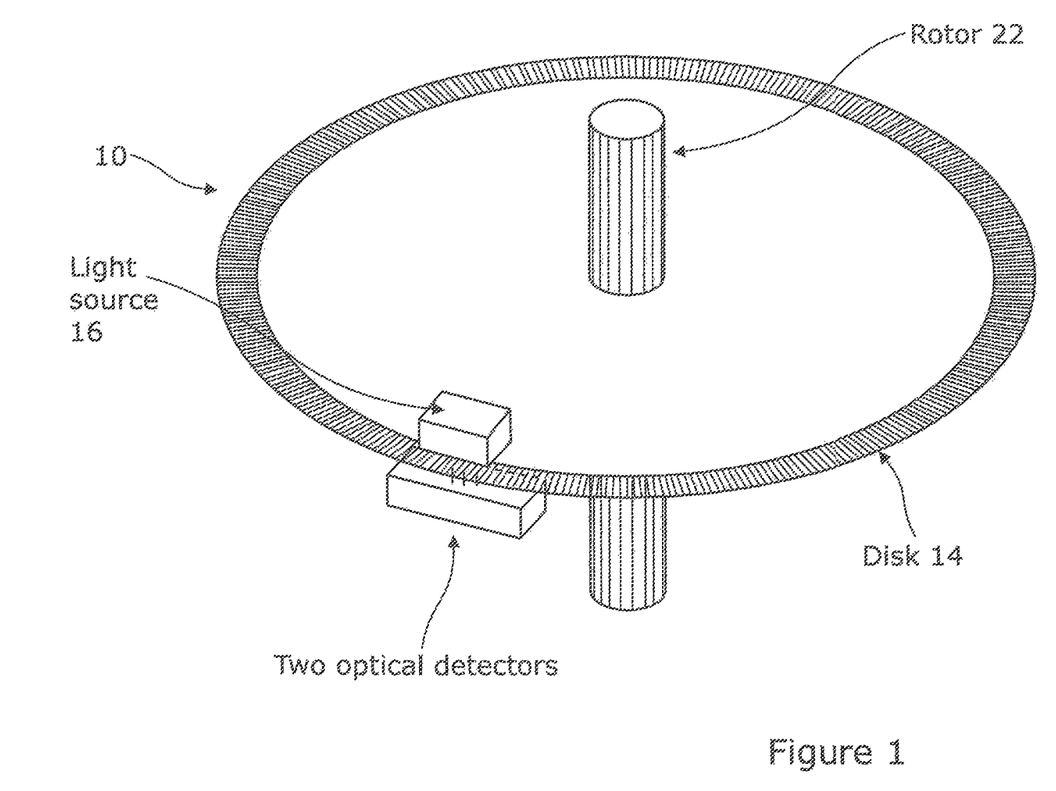
FIG. 1 is a schematic of a typical rotary angular position sensor that may be used in a method of the present disclosure.

A typical rotary position sensor assembly is shown schematically in FIG. 1 of the drawings. The sensor assembly 10 is suitable for measuring the angular position of any object that rotates around a fixed axis, for example the rotor of a motor or rotor of a rotary or linear actuator. This kind of position sensor is sometimes referred to as a rotary encoder. The sensor assembly 10 converts movement of the rotor into a changing output signal or signals, the pattern of change or the instantaneous values of the output signal or signals providing a measure of the angular position. Depending on the configuration of the position sensor, this output may provide an unambiguous position measurement over only part of a rotation of the rotor, or a whole rotation, or over a number of rotations.

The sensor assembly 10 comprises one or more sensors 12, in this example two optical photodetectors. A target in the form of a disk 14 having an annular track of alternating transparent and opaque regions, and a light source 16. The light source and sensor are on opposite sides of the disk. The sensors 12 each produce an output signal that has one value when the disk is aligned with a transparent region between the light source and the sensor, and a second value when there is an opaque region between the light source and the sensor. The output signal may be processed to produce an angular position signal.

By fixing the disk 14 to a rotor of a motor, for example, continuous rotation of the rotor in one direction will cause each of the transparent regions to move across the sensor, causing the sensor output to vary between the first and second values over time with a period dependent on the speed of rotation of the rotor. By counting the changes in value, the position of the rotor can be tracked. Using two sensors as shown each of which is offset by one half of the width of the transparent regions, the direction of rotation can also be determined from the pattern of changes of the signals.

The relative angular position of the sensor target disk and the rotor are important. Typically the position measurement output from the sensor will be used to control the position of the rotor, and it is not always possible to ensure that the relative angular positions are consistent during assembly. A measurement of 0 degrees output from the rotary angular position sensor may not correspond precisely with an actual 0 degrees of the rotor where the rotor is part of an electric motor. Since the rotor 0 degrees must be known precisely for motor control in many cases, it is essential to be able to determine the offset during manufacture or in subsequent calibration.

Figure 2:
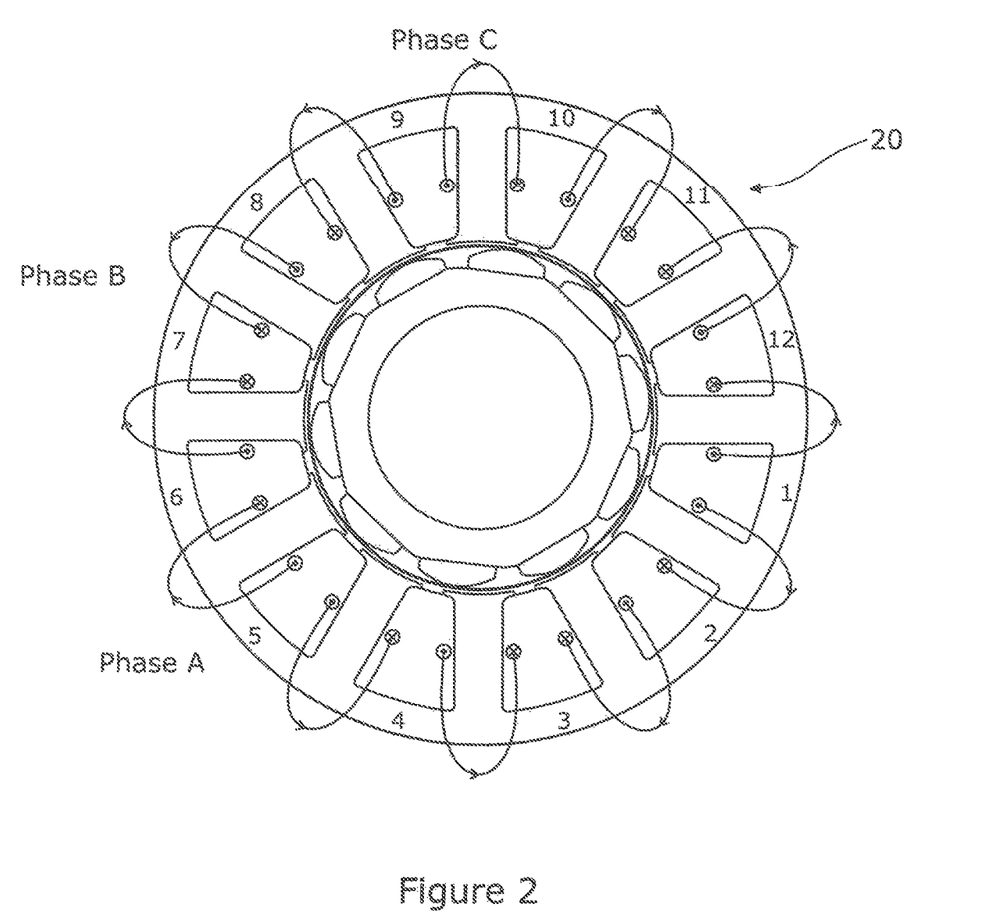
FIG. 2 is a plan view of a permanent magnet AC synchronous motor in which the rotor is in equilibrium aligned with a vector aligned with Phase A.
Figure 3:
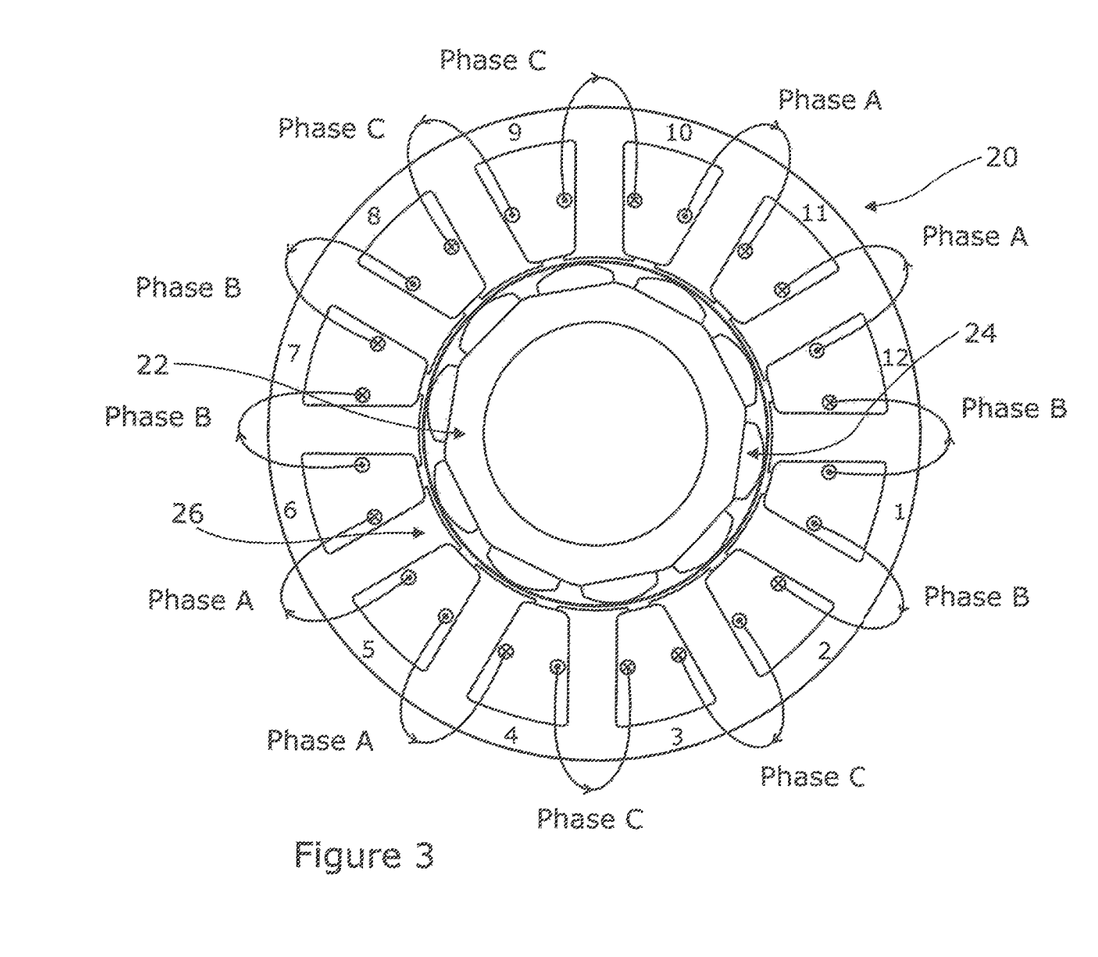
FIG. 3 is a corresponding plan view of the motor of FIG. 2 in which the motor rotor is not in equilibrium.

To understand how the method of the present disclosure determines the offset, it is helpful first to summarise the concept of vector control of a three phase (or higher number of phase) AC multi-phase permanent magnet motor. FIGS. 2 and 3 show schematically a typical motor 20 which can be controlled using a vector control strategy. The motor comprises a rotor 22 carrying a set of rotor magnets 24 whose poles alternate around the circumference of the rotor. The motor also includes a stator 26 which has a set of stator teeth 28 around which coils of electrically conductive wire are turned. These coils are connected together to form three phases A, B and C although conventionally the voltages in each phase will be denoted by the suffixes u, v and w. Each of the phases is 120 degrees electrical apart. There will typically be N electrical cycles per mechanical revolution for an N pole pair rotor.

Figure 5:
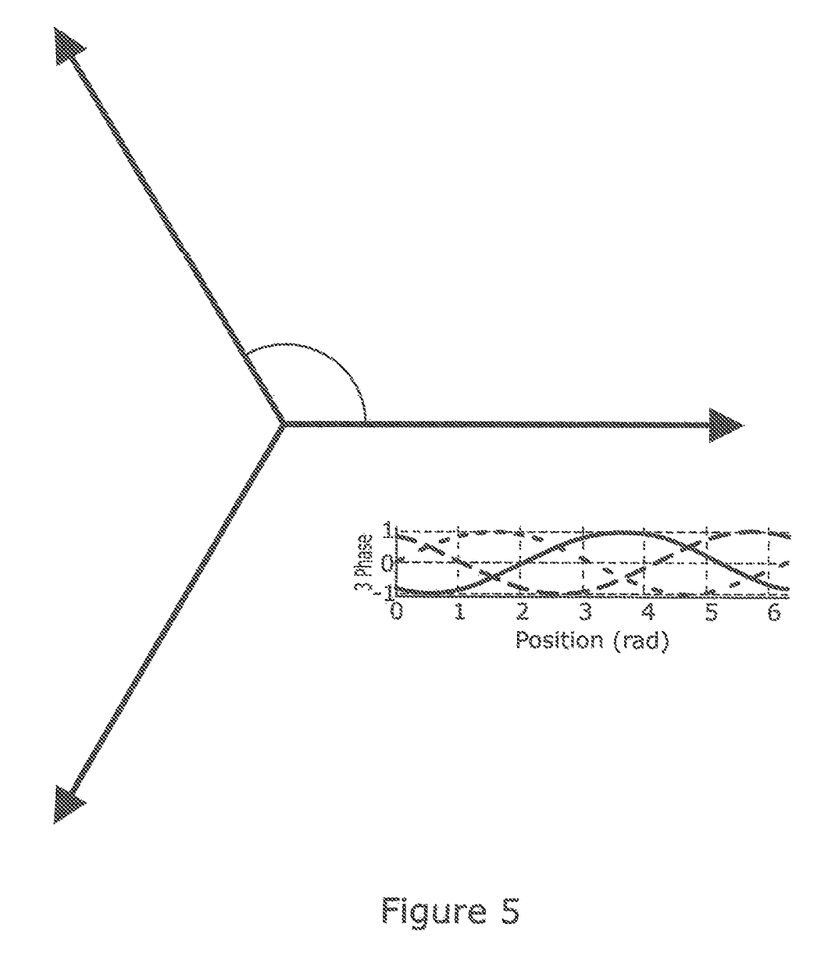
FIG. 5 represents the three phase AC waveforms applied to the motor of FIG. 2.
Figure 6:
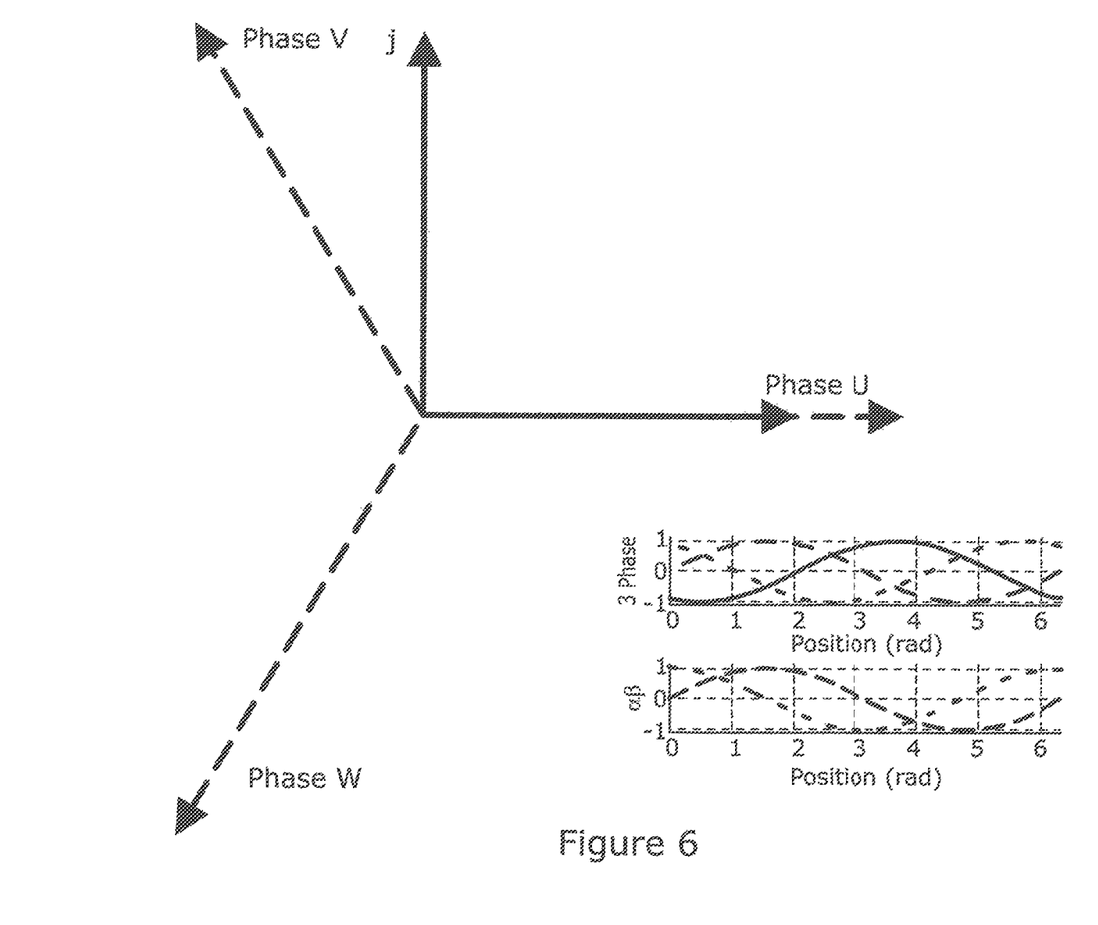
FIG. 6 is a transform into a two coordinate frame fixed with reference to the stator.

A sinusoidal voltage waveform is applied to each phase, with each sinusoid offset from the others by 120 degrees. This is shown in FIG. 5. These waveforms can be synthesized from a DC voltage source such as a battery, making this type of motor especially suitable for use in an automotive application. As shown in FIG. 6, the three voltage waveforms and be reduced to a 2 coordinate reference system fixed to the stator frame using the following transform:

$$\begin{bmatrix} i_\alpha(t) \\ i_\beta(t) \end{bmatrix} = \frac{2}{3} \begin{bmatrix} 1 & 0 & 0 \\ 0 & \sqrt{3}/2 & -\sqrt{3}/2 \end{bmatrix} \begin{bmatrix} i_U(t) \\ i_V(t) \\ i_W(t) \end{bmatrix}$$

Figure 7:
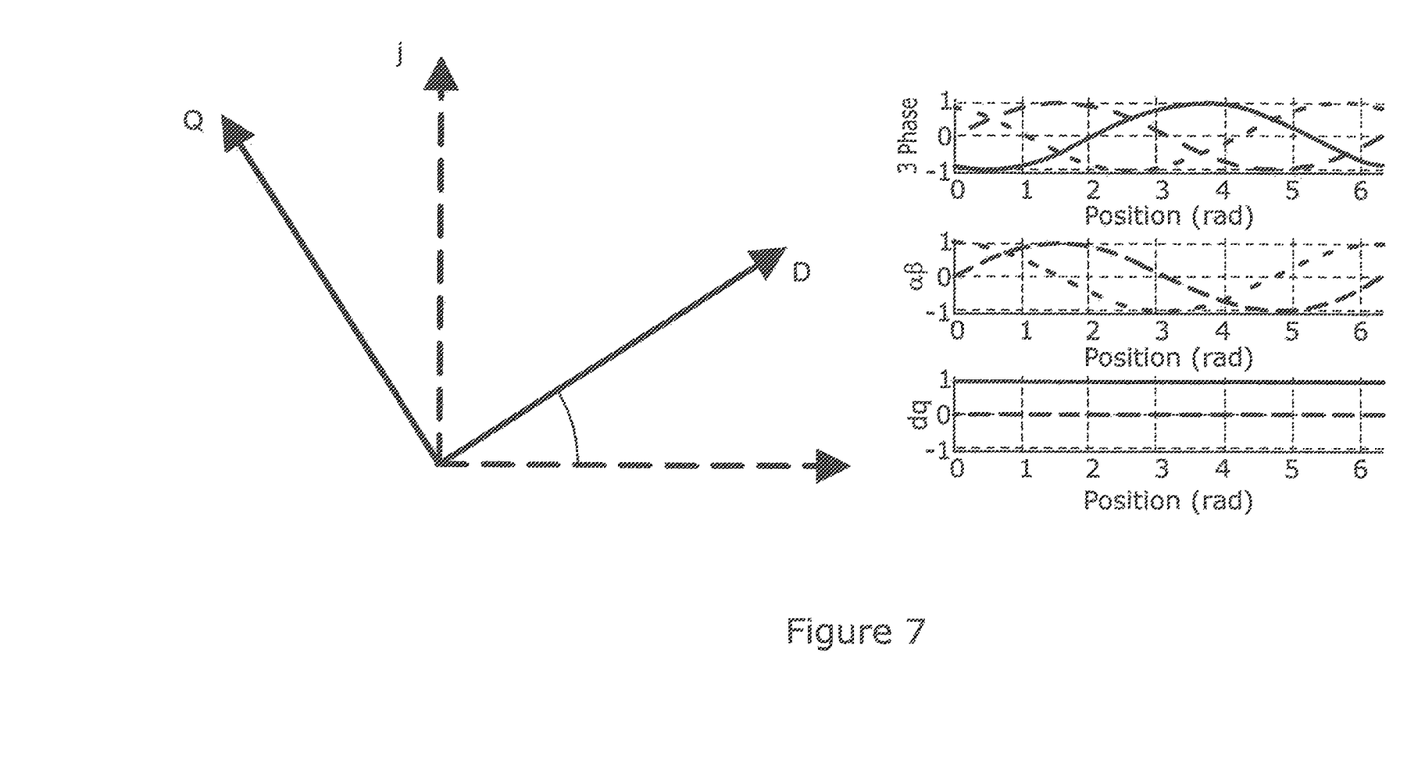
FIG. 7 is a further transform into a two coordinate frame fixed with reference to the motor rotor.

Stator reference frame (αβ) can also be transformed as shown in FIG. 7 so that the phase quantities are 2 orthogonal vectors, synchronised to the rotor, in a so called dq frame of reference. The q (quadrature) axis vector is aligned with the rotor back-emf. The d (direct) axis vector is aligned with the rotor magnetic flux. Applying current to the q axis generates motor torque. With the rotor aligned with the d axis vector there is no torque generated:

$$\begin{bmatrix} i_d(t) \\ i_q(t) \end{bmatrix} = e^{-j\theta(t)} \begin{bmatrix} i_\alpha(t) \\ i_\beta(t) \end{bmatrix}$$

$$= \begin{bmatrix} \cos(\theta) & \sin(\theta) \\ -\sin(\theta) & \cos(\theta) \end{bmatrix} \begin{bmatrix} i_\alpha(t) \\ i_\beta(t) \end{bmatrix}$$

During normal operation of the motor, it is desirable to align the vector with the q axis to generate a torque to turn the motor without wasting energy.

In FIG. 2, the rotor is positioned where current flowing into phase A and out of the two other phases will generate a vector in the dq frame which is aligned with the d axis, so the rotor is in equilibrium and will not be subjected to any torque that will cause it to rotate. On the other hand, the rotor in FIG. 3 is positioned so that the vector is on the q-axis when current flows into phase A and out of the other two phases, which will cause the rotor to rotate towards the position of FIG. 2.

Figure 4:
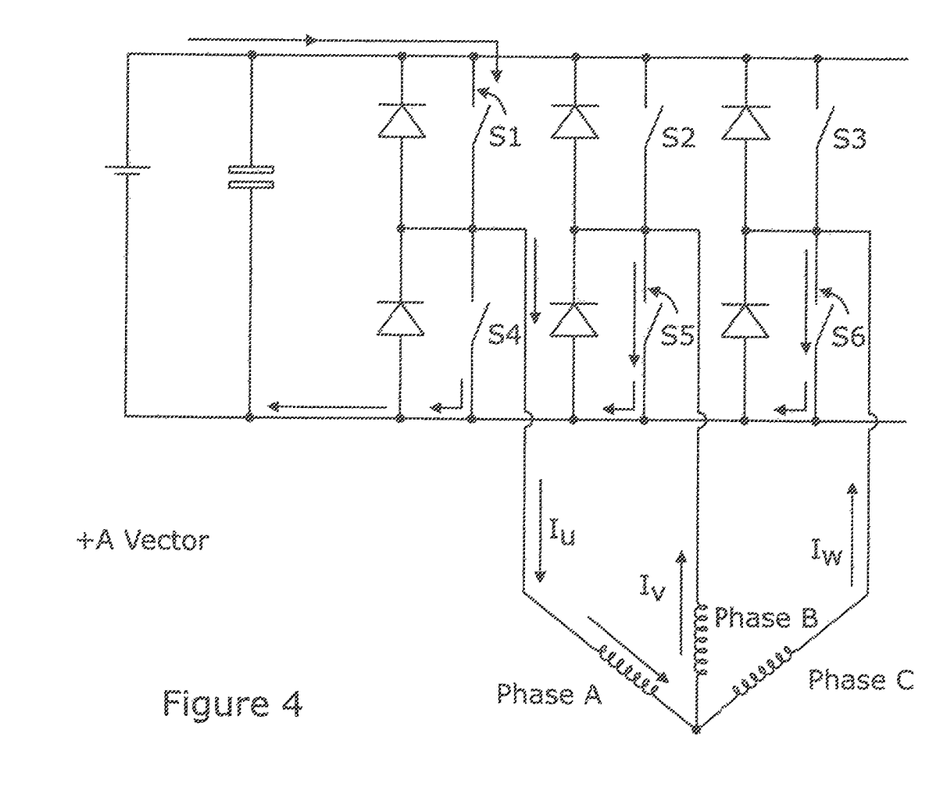
FIG. 4 is a circuit diagram showing the currents flowing in a bridge that will provide the vector used in the motor in FIG. 2 to keep the motor rotor aligned with Phase A.

The phases A, B, and C may be connected in a bridge as shown in FIG. 4. Driving the switches of the bridge using conventional PWM techniques enables a sinusoidal or DC current to flow in each phase.

The applicant has appreciated that by generating a vector that is at a fixed position in the Stator reference frame (αβ) and allowing the rotor to move freely until it is aligned with the vector in the dq frame, so that the dq vector is lying on the d axis, can be used to move the rotor to a known angular position from which an estimate of the offset of a position sensor can be determined.

First Exemplary Method: In a first implementation of a method of learning the offset of a position sensor, the position offset is estimated by fixing the motor position to 0 degrees electrical. Typically this corresponds to the location of the A phase and to achieve the required d-axis vector the current will flow into the A phase and out of both of the B and C phases equally. FIG. 4 shows such a voltage pattern (note that u, v, and w correspond to phases A, B, and C). This produces a vector that does not produce any torque component that will tend to cause the motor rotor to rotate, provided the rotor is at the zero position. If the motor rotor is not initially at the zero position, this vector will produce a torque component causing the motor to rotate until it aligns at the 0 degrees position where the vector lies on the d axis only. The position reading from the position sensor can then be used as the position offset value.

This process may be performed as many times as there are different electrical rotations within each mechanical rotation of the motor so that the offset is calculated at each electrical cycle over one whole mechanical revolution and the average used as the position offset. This is done to take account any first order effects from the position sensor and any characteristics of the motor itself. Within each electrical rotation, the different phases current can be energized in sequence to both rotate the motor and stop at additional known electrical positions. Within the upper graph of FIG. 11, three separate discrete positions can be seen, each 120 electrical degrees apart within one mechanical revolution of a 5 pole pair motor.

Second Exemplary Method: In a refinement, rather than applying a fixed vector that lies on the d axis when the rotor is at 0 degrees, a small dither is applied to the vector that causes the vector to move backwards and forwards across the 0 degrees position. This movement is then measured by observing the output of the position sensor over time and taking the mean position value, which will correspond to the centre of the range of movement, to provide the offset measurement. The applicant has appreciated that the use of a dither will help to mitigate against friction due to constant motion/torque and correct bias seen in existing algorithm due to only approaching the D axis from one direction.

Figure 8:
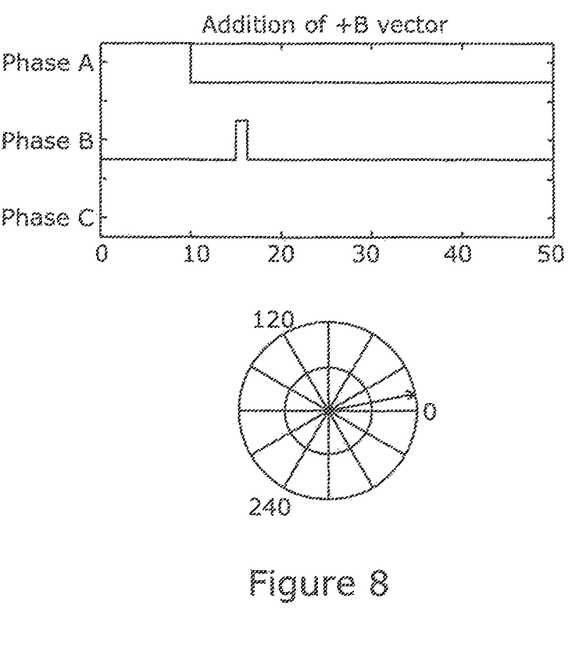
FIG. 8 illustrates how a dither of the vector used in the method of the first example can be applied by adding small currents to the B and C phases.
Figure 9:
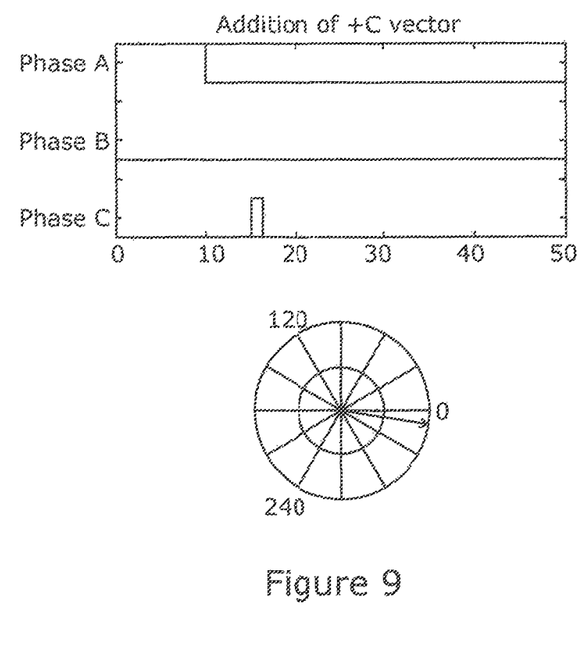
FIG. 9 illustrates how a dither of the vector used in the method of the first example can be applied by adding small currents to the B and C phases.

The vector dither is generated by alternating between adding a small +B and +C vector to the +A vector, assuming that Phase A corresponds to the zero position. The vector length should be proportional to +A vector to ensure the dithered vector angle is always the same. FIGS. 8 and 9 show how the small offsets can be applied by controlling the current applied to each phase, and the resulting vector in the stator reference frame.

Figure 10:
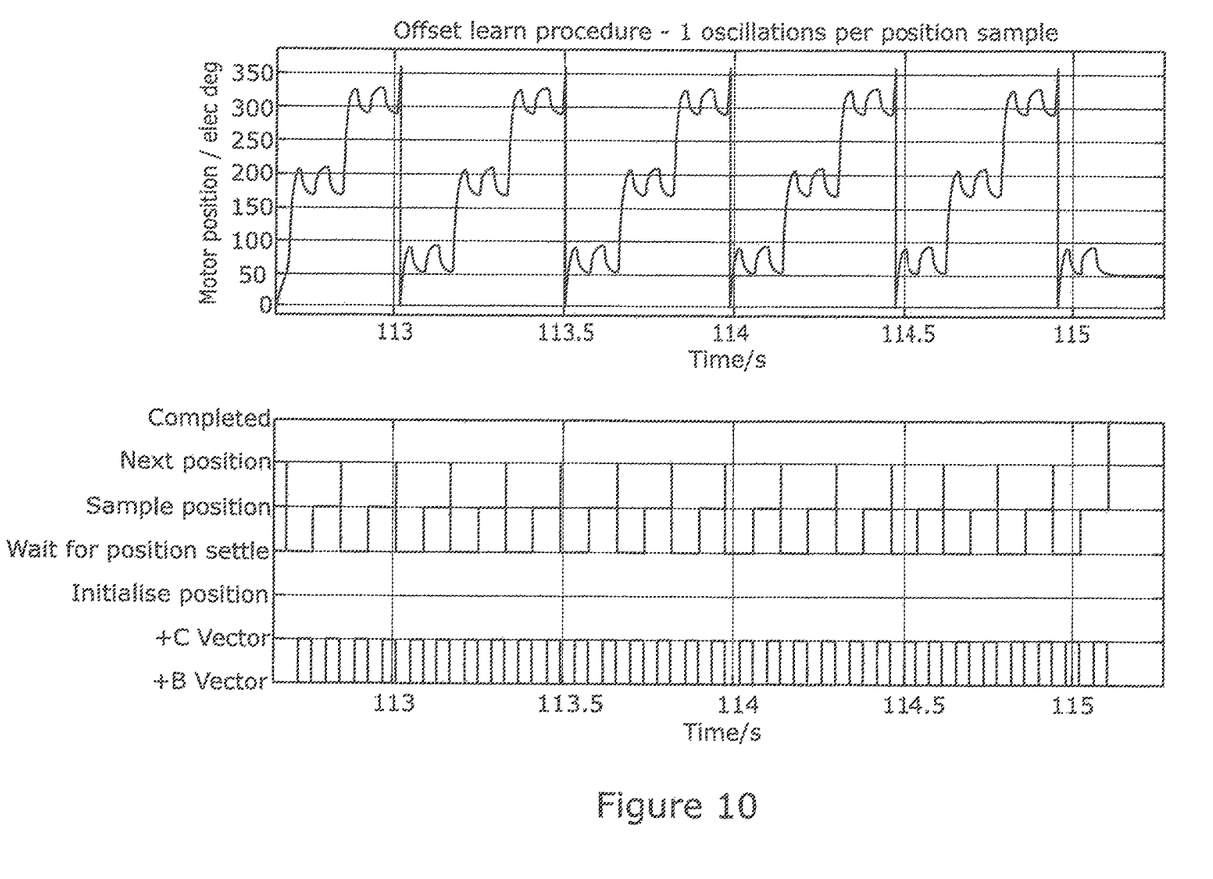
FIG. 10 shows the steps of a second exemplary method which applies a dither of one cycle per estimate.
Figure 11:
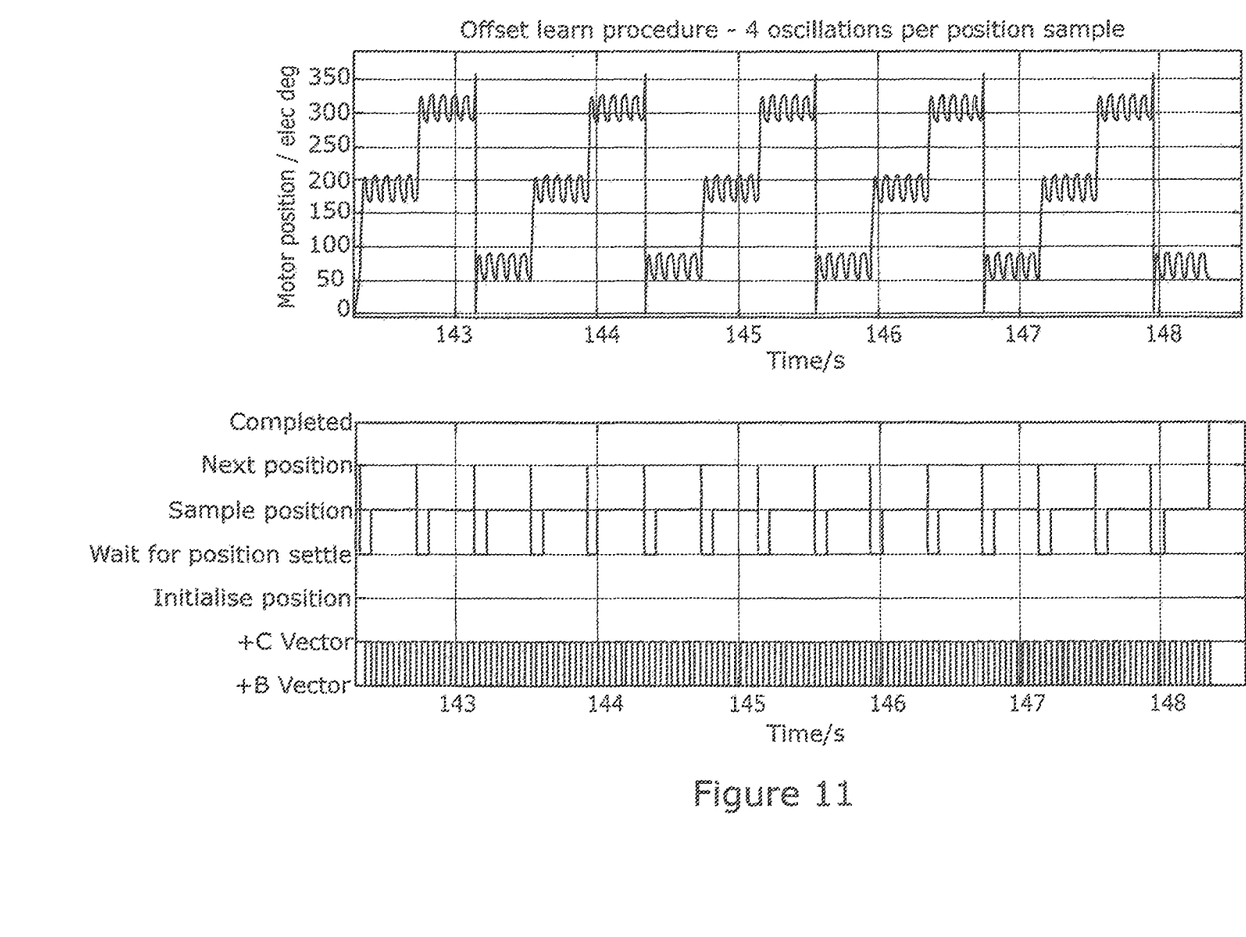
FIG. 11 shows a modification to the second exemplary method which applies a dither of four cycles per estimate.

Again, this can be repeated for every electrical cycle over a complete mechanical revolution of the motor. FIGS. 10 and 11 show the movement of the rotor around a complete mechanical revolution during a sequence of vectors which have one dither per measurement and four dithers per measurement respectively. In each case, the current primarily flows into the A phase and out of the other two phases.

OFFSET LEARN FOR END STOP: The first and second exemplary methods require the motor to be stepped around a complete mechanical revolution to perform the required position measurements. This will not be possible if the rotor is positioned at or within one mechanical revolution of an end stop at the start of the test.

Figure 12:
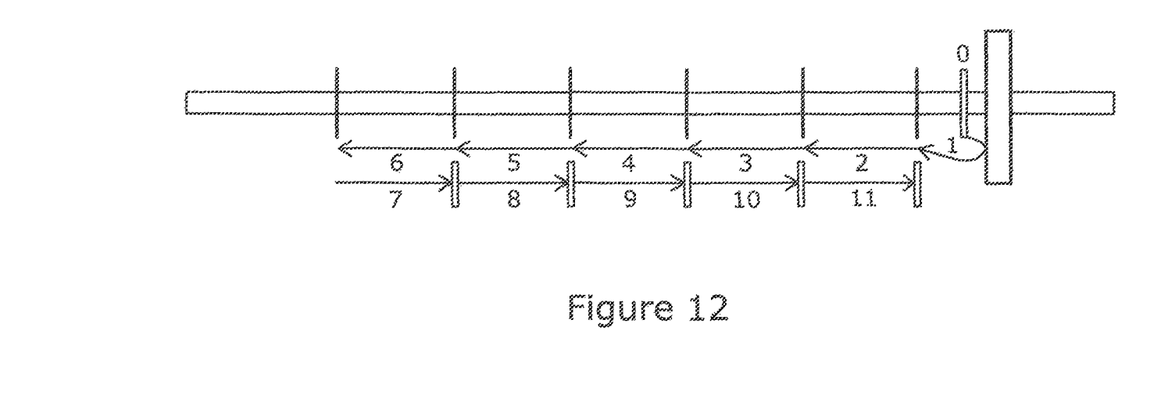
FIG. 12 shows the steps that may be performed prior to carrying out the first or second exemplary method when the motor rotor hits an end stop in a positive direction (i.e. in the direction around which the rotor is moved during the sequence of measurements)

To allow for this, the method may perform for a five pole pair motor the following steps shown in FIG. 12:

0: Initial motor position at start of offset learn sequence

1: Motor position set to 0 and +A phase voltage vector applied. If near the endstop the motor may move towards the endstop. Motor position then rotated in a negative direction over 1 revolution. Even if near endstop this will move the motor away to D axis position 0.

2-6: Repeat motor rotation for 5 more electrical revolutions—the motor moves away from endstop leaving room for offset learn procedure.

7: Move forward one revolution and learn 1st offset.

8-11: Repeat step 7 for next 4 revolutions and calculate offset.

Figure 13:
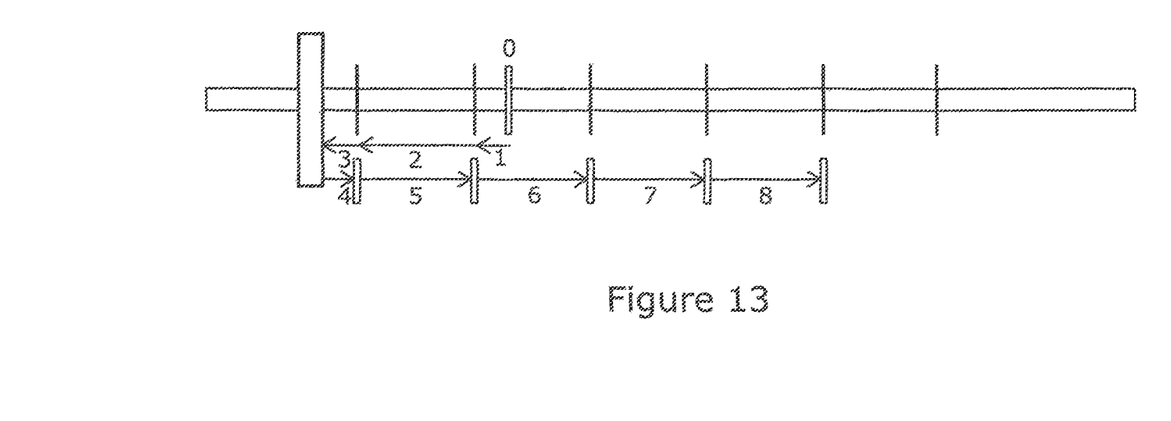
FIG. 13 shows the steps that may be performed prior to carrying out the first or second exemplary method when the motor rotor hits an end stop in a negative direction (i.e. in the opposite direction to which the rotor is moved during the sequence of measurements)

If the motor is positioned at or within one revolution of the opposite end stop, the following steps shown in FIG. 13 may be performed:

Sequence: 0: Initial motor position at start of offset learn sequence

1: Motor position set to 0 and voltage vector applied. Rotate motor one revolution in negative direction. Motor moves to D axis 0 position.

2: Repeat step 1.

3: Repeat again. In this case we hit and jam against the endstop as cannot reach position 0. This is detected by seeing the position sensor not recording a full revolution rotated.

4: Move forward one revolution. Successfully moves to position 0. Learn first offset.

5-8 Repeat step 4 for the next 4 revolutions and calculate offset.

Third Exemplary Method: The method of the first and second examples only take measurements at 0 degrees electrical and take averages. In the event that the motor phase resistances are imbalanced, this may not produce a completely accurate estimate. For example, if the resistance of phase B is higher than phase C if there is an imbalance of resistance between the motor phases which might cause a deviation in the motor position.

Figure 14:
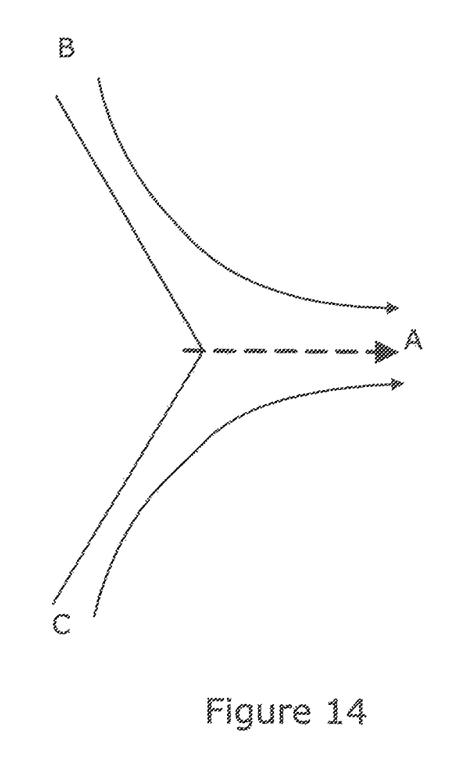
FIG. 14 illustrates how a phase imbalance between phases B and C will produce slightly different vector positions compared with the ideal case that may lead to a measurement error.
Figure 15:
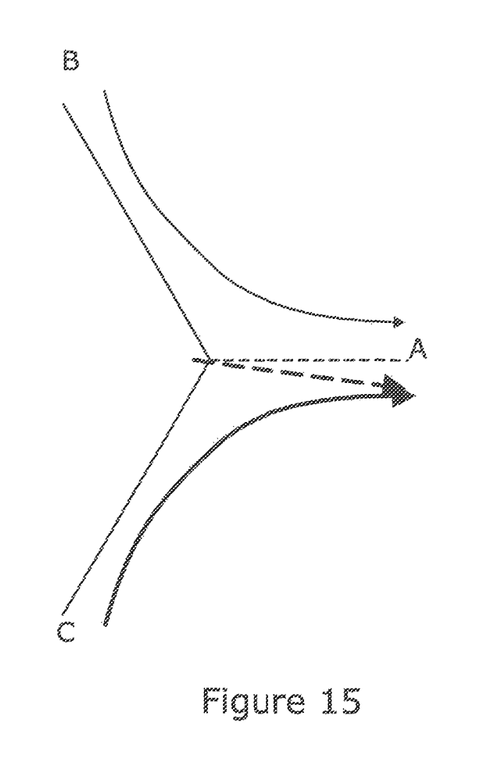
FIG. 15 illustrates how a phase imbalance between phases B and C will produce slightly different vector positions compared with the ideal case that may lead to a measurement error.

A typical motor specification may allow for up to 5% difference in resistance between motor phases. This phase imbalance will not cause a difference in the true motor position offset/alignment but it will instead result in torque ripple. In the method of the first and second examples, the position sensor alignment is achieved by energising phase A to move the rotor to a point at which there is no net torque. This means current flow in through phase A and then evenly through phases B and C. A resistive imbalance between phases B and C will result in different current flow across these phases which would affect the final motor position. This can be seen in FIGS. 14 and 15.

If the position offset is calculated for all three phases instead of just phase A, the resistance imbalance will be cancelled out.

A specific implementation of the method in accordance with an aspect of the disclosure which compensates for such an imbalance is set out below. As with the first and second examples, this method is designed for a 3 phase AC motor having 10 poles, and hence 5 electrical revolutions per each full mechanical revolution of the motor rotor giving a total of 15 possible positions at which the rotor is aligned with one of the three phases. In the following, the three phases are denoted Phase A, Phase B and Phase C, each offset by 120 degrees electrical and with Phase A corresponding to the 0 degrees electrical position. The method can be readily modified for other motor topologies.

The method steps are as follows:

START: Step 1: Override position sensor and set motor position signal used for motor control to 0 degrees.

Step 2: Apply open loop D axis voltage demand sufficient to cause the motor to rotate close to real position of 0 degrees.

The following steps 3 and 4 are then performed in order to MOVE the MOTOR TO a SAFE POSITION AND DETECT ENDSTOPS:

Step 3: Wait for period of time for motor position to settle.

Step 4: Rotate the motor position signal used for motor control in a negative direction until the motor has rotated over one mechanical revolution. After each electrical revolution has been seen and the motor position wraps back to 0 check the signal from the position sensor. If this does not show the same value within a tolerance as at the start of the last electrical revolution and has not moved >180 electrical degrees over the last revolution assume an endstop has been hit and go to step 5.

Once the end stop position has been learnt, the following step may be carried out to MOVE the MOTOR FORWARDS READY TO BEGIN OFFSET LEARN Step 5: Now rotate the position vector forward until 2 electrical revolutions have been completed.

Now the motor is in a correct position the following steps 6 to 12 are performed to LEARN the motor position OFFSET:

Step 6: Apply alternate PWM pattern. Increase D axis voltage demand from initial value used to move motor to safe position at start of the sequence. PWM pattern has fixed length +A vector with also a small +B or +C vector. Pattern will alternate between +A+B to +A+C vector at fixed time intervals. Applying the current in through one phase, in this case Phase A, and out of the other two will cause the rotor to move and stop in a position where no torque is available i.e. a d-axis position.

Applying mainly one vector, with small contributions from the other two will cause the rotor to dither about a point which is the angular position corresponding to 0 degrees for Phase A. The method of dithering about a point is advantageous as it means the correct d-axis position can be located, rather than the point at which the alignment torque matched the friction torque. To avoid dead time issues no motor phase should switch at the same time as the other. Without this step, the dead time would add/subtract from the vectors applied. Offsets would result which may be acceptable in some cases but not if greater accuracy is required.

Step 7: Wait until motor has completed one +A+B sequence and one +A+C sequence.

Step 8: Start sampling and filtering the motor position. Continue until several more +A+B, +A+C switching sequences have completed. Repeat the process several times to obtain an average, and to get the rotor going through the d-axis position, rather than stopping on one side of it.

Step 9: Save the filtered motor position value. Remove the offset depending on which physical motor phase the position was sampled. (Phase A=0, phase B=120 and phase C=240 degrees).

Step 10: Change the PWM pattern so the switching pattern appropriate to next phase is applied. For example, to apply the +B vector, in FIG. 4, switches S2, S4 and S6 would be turned on. Applying the vector corresponding to the next phase results in the motor position moving 120 electrical degrees forward. So instead of large +A vector with smaller +B/C vectors, pattern will be large +B with smaller +A/C vectors, then large +C+A, +C+B. Through cycling through the phases, we get 3 chances (for a 3 phase system) to check the alignment in each electrical cycle, and 3×pole-pairs in a mechanical revolution e.g. for a 12-slot, 10 pole motor, 15 times per mechanical revolution.

Step 11: Go back to step 7 and repeat until 3×number of motor pole pairs measurements have been taken. This indicates the motor has turned a full mechanical revolution.

Step 12: Remove D axis voltage demand and restore normal pwm operation.

Finally, an optional CHECK of the RESULTS may be performed by the following two steps:

Step 13: For each saved position offset value check each value does not deviate from any other by>set threshold which would indicate a problem with the offset learn. The check can also be used to identify a problem with the motor, drive stage, or connected load and therefore used for diagnostic purposes.

Step 14: Save position offset as average of the samples taken.

The method of the disclosure may be used to carry out offset measurement for rotary position sensors in a range of applications where the rotary position sensor is secured to the rotor of a suitable motor or to a part which rotates with the rotor of the motor.

The skilled person will understand that the examples given in this description are merely representative and can be varied within the scope of the disclosure.

The invention claimed is:

1. A method of determining an offset between an angular position indicated by a rotary position sensor assembly secured directly or indirectly to a motor rotor of a multi-phase permanent magnet AC motor and an actual electrical position of the motor rotor, the motor comprising a plurality of phases, the method comprising the steps of:
applying a vector to the motor, which is aligned with a known angular position of the motor, and that alternates between a first value in which the vector is slightly advanced of the known position and a second position in which the vector is slightly behind the known position so as to cause the motor rotor to dither back and forth across the known position;
waiting for the motor rotor to move to a location in which the vector when considered in a dq frame of reference is centered on a d-axis;
measuring the angular position of the rotor indicated by the position sensor;
determining the offset from the difference between the measured angular position and the known actual position of the vector; and
controlling an actuator comprising the motor based on the determined offset.

2. The method of claim 1, further comprising the step of selecting a vector which is aligned with a first one of the motor phases corresponding to zero degrees electrical of the motor.

3. The method of claim 2 further comprising the step of applying a vector that is fixed in position relative to the motor stator during the measurement time and aligned with the one phase, so that current only flows in through one phase and flows equally out of the other phases of the motor.

4. The method of claim 3 when used with a three phase motor with phases A, B and C, the method further comprising the steps of:
applying values of A+B and A+C vector respectively for fixed alternate time intervals to cause the rotor to dither about an angular position centred on Phase A;
determining the angular centre position about which the rotor dithers and
determining the offset between that position and the actual position.

5. The method of claim 4 wherein the centre position is derived by determining the average position of the rotor from the varying output of the angular position sensor.

6. The method of claim 5 further comprising the steps of:
at a later time applying a vector aligned with a second, different, known angular position on the motor stator;
waiting for the motor rotor to move to a location in which the vector when considered in the dq frame of reference is centered on the d-axis;
measuring the angular position of the rotor indicated by the position sensor; and
determining the offset from the difference between the measured angular position and the known actual centre position of the second vector.

7. The method of claim 6 further comprising the step of:
applying vectors that have known positions that change in a sequence that moves in a single direction around the stator over time such that the change of vector position causes the rotor to follow the vectors around the stator and step through a range of electrical positions that are increasingly offset both electrically and mechanically from the start position set by the first vector.

8. The method of claim 7 further comprising the step of:
repeatedly moving the vector and taking position measurements until the rotor has moved by one full mechanical revolution, and taking an average of the estimates to produce an overall estimate of the offset.

9. The method of claim 8 further comprising the step of:
for each estimate obtained from each fixed or dithered vector position, performing a check that an estimated value does not deviate from any other estimated value by an amount greater than a set threshold, and in the event that it does raising an error flag.

10. The method of claim 9 further comprising the step of:
generating a rotating $\alpha\beta$ frame vector, before any estimate are made, that will cause the rotor to rotate through one continuous mechanical revolution and during the rotation measuring the angular position of the rotor,
whereby, in the event that the angular position does not indicate that the rotor has moved through one full mechanical revolution, the method determines that the motor rotor has hit an endstop, and, only in that event, subsequently generating a rotating $\alpha\beta$ frame vector that will cause the rotor to rotate through an angle greater than or equal to one continuous mechanical revolution in the opposite direction and permitting the rotor to move to follow the vector.

11. A method according to claim 10, wherein the vectors are pulse width modulated voltages.

12. A linear actuator comprising:
a motor having a rotor;
a mechanical arrangement which converts rotation of the rotor into a linear translation of an output part, the range of movement of the rotor being limited by the allowable range of movement of the linear part;
a rotary position sensor assembly fixed to the rotor; and
a signal processing unit arranged in use to determine an offset between an angular position indicated by the rotary position sensor assembly and an actual electrical position of the motor rotor by carrying out the steps of the method of any preceding claim.

* * * * *